United States Patent [19]

Yanadori et al.

[11] 4,333,520
[45] Jun. 8, 1982

[54] HEATING AND COOLING VENTILATING SYSTEM WITH HEAT RECOVERY

[75] Inventors: Michio Yanadori, Hachioji; Kengo Hasegawa, Sakura; Motokazu Uchida, Tokyo, all of Japan

[73] Assignee: Hitachi, Ltd., Tokyo, Japan

[21] Appl. No.: 156,116

[22] Filed: Jun. 3, 1980

[30] Foreign Application Priority Data

Jun. 4, 1979 [JP] Japan ............................ 54-68959

[51] Int. Cl.³ .................... F24F 7/00; F28D 15/00
[52] U.S. Cl. ................................ 165/59; 62/333; 165/104.21; 165/122; 237/49
[58] Field of Search ..................... 165/59, 104.21, 48, 165/122, 57, DIG. 12; 62/119, 333; 237/49

[56] References Cited

U.S. PATENT DOCUMENTS 3,603,379 9/1971 Leonard, Jr. ..................... 62/333 X
3,977,466 8/1976 Johansson ........................ 165/59 X
4,040,477 8/1977 Garberick ................... 165/104.21 X

FOREIGN PATENT DOCUMENTS 52-50058 4/1977 Japan ......................... 165/104.21

*Primary Examiner*—Albert W. Davis
*Attorney, Agent, or Firm*—Craig and Antonelli

[57] ABSTRACT

A ventilating system including a heat exchanger utilizing boiling and condensation of a liquid mounted in a cabinet formed with a first air passage and a second air passage by a partition plate extending horizontally across the heat exchanger substantially in the center thereof. At least one air sucking and exhausting fan is mounted in one of the first and second air passages, and the heat exchanger is provided with at least one auxiliary heat exchanger operative to perform space cooling or space heating. The first and second air passages are each provided with ventilating ports for effecting heat recovery, ventilating ports for effecting cooling by ventilation and a ventilating port for allowing cooled air or heated air to flow therethrough, so that the ventilating system can be operated in a heat recovery mode, a cooling by ventilation mode and a space cooling or space heating mode by actuating the auxiliary heat exchanger and suitably opening and closing various ventilating ports.

6 Claims, 27 Drawing Figures

HEATING AND COOLING VENTILATING SYSTEM WITH HEAT RECOVERY

BACKGROUND OF THE INVENTION

1. Field of the Invention

This invention relates to ventilating systems provided with heat exchangers utilizing boiling and condensation of a liquid contained in hermetically sealed containers, and more particularly it is concerned with a ventilating system of the type which is suitable for use for recovering waste heat when ventilation is carried out while space heating or cooling is being effected, for effecting cooling or heating of a space and for effecting cooling by ventilation at night in the summertime.

2. Description of the Prior Art

One type of ventilating system having a heat exchanger known in the art comprises hermetically sealed containers of the heat exchanger having a multiplicity of fins and containing alcohol, a fluoro-carbon, water or other vaporizable liquid sealed therein, a first air passage and a second air passage formed in a cabinet by a partition plate disposed substantially horizontally in the middle of the cabinet, and an air sucking and exhausting fan mounted at least in one of the first air passage and the second air passage. Such ventilating system is generally mounted in a window or a hole formed in a wall of a room.

In the ventilating system of the aforesaid construction, when foul air in the room is exhausted from indoor to outdoor while cooling or heating of the room is being carried out, heat is recovered from the foul air and transferred to fresh air by the heat exchanger as the former is exhausted from the room and the latter is introduced into the room. That is, waste heat is recovered when ventilation is carried out.

When the outdoor temperature drops below the indoor temperature at night in the summertime, for example, the ventilating system is capable of effecting cooling by ventilation wherein cool air is positively drawn by suction from the atmosphere into the room while exhausting warm air from the room to the atmosphere, without effecting heat recovery by means of the heat exchanger.

The ventilating system of the aforesaid construction of the prior art must have an air conditioner or a heater installed separately from the ventilating system when it is desired to carry out space cooling or space heating on a full-scale, because the conventional ventilating system only has the functions of effecting ventilation and heat recovery. Thus the system has the disadvantage of becoming large in overall size.

SUMMARY OF THE INVENTION

This invention has as its object the provision of a ventilating system provided with a heat exchanger which has the function of carrying out space cooling and space heating without increasing size.

According to the invention, there is provided a ventilating system comprising a heat exchanger mounted in a cabinet and utilizing boiling and condensation of a fluid, and an auxiliary heat exchanger functioning as a cooler when space cooling is carried out and as a heater when space heating is carried out. The heat exchanger is divided into upper and lower portions by a partition plate disposed substantially across the middle of the heat exchanger, and a first air passage is formed in a lower portion of the cabinet while a second air passage is formed in an upper portion thereof. The first and second air passages are each in communication with ventilating ports for effecting cooling by ventilation, a ventilating port for allowing cooled air or heated air to flow therethrough and ventilating ports for effecting heat recovery. By opening and closing these ventilating ports and operating the auxiliary heat exchanger in a suitable fashion, it is possible to make the ventilating system effect recovery of waste heat, cooling by ventilation and space heating or space cooling.

DESCRIPTION OF THE PREFERRED EMBODIMENTS

Figure 1:
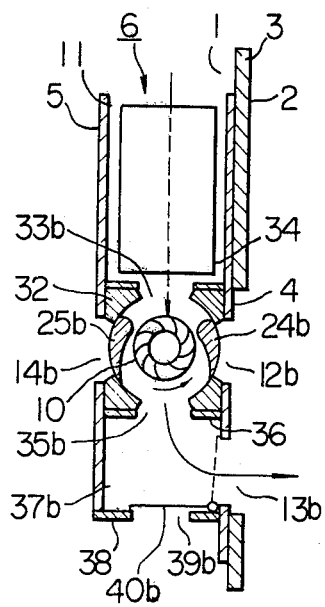
FIGS. 1 and 2 are horizontal sectional views of upper and lower portions respectively of the ventilating system comprising one embodiment of the invention.
Figure 2:
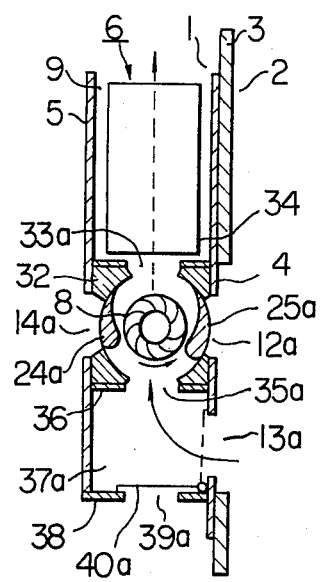
Figure 3:
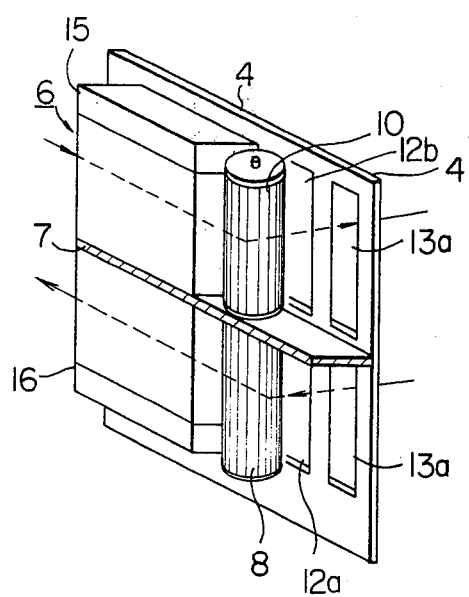
FIG. 3 is a perspective view, with certain parts being omitted, of the ventilating system shown in FIGS. 1 and 2.

One embodiment of the invention will be described by referring to FIGS. 1-6D. FIGS. 1 and 2 are horizontal sectional views of upper and lower portions respectively of the ventilating system, FIG. 3 is a perspective view, with certain parts being omitted, of the ventilating system shown in FIGS. 1 and 2, and FIG. 4 shows the heat exchanger in a concrete form.

The ventilating system comprises a heat exchanger 6 utilizing boiling and condensation of a liquid mounted between walls 4 and 5 of a cabinet affixed to a wall 3 of a building separating an indoor space 1 from an outdoor area 2. The heat exchanger 6 is divided into an upper portion and a lower portion by a partition plate 7 disposed horizontally across the heat exchanger 6 substantially in the center thereof, so that a first air passage 9 mounting a lower fan 8 and a second air passage 11 mounting an upper fan 10 are formed in the cabinet. The wall 4 of the cabinet near the wall 3 of the building is formed with a ventilating port 12a for effecting cooling by ventilation and a ventilating port 13a for effecting heat recovery disposed in the first air passage 9, and a ventilating port 12b for effecting cooling by ventilation and a ventilating port 13b for effecting heat recovery disposed in the second air passage 11. The wall 5 of the cabinet remote from the wall 3 is formed with ventilating ports 14a and 14b for effecting cooling by ventilation disposed in the first and second air passages 9 and 11 respectively.

The heat exchanger 6 has a cooler 15 attached to its upper end to function as an auxiliary heat exchanger and a heater 16 attached to its lower end to function as an auxiliary heat exchanger.

Figure 4:
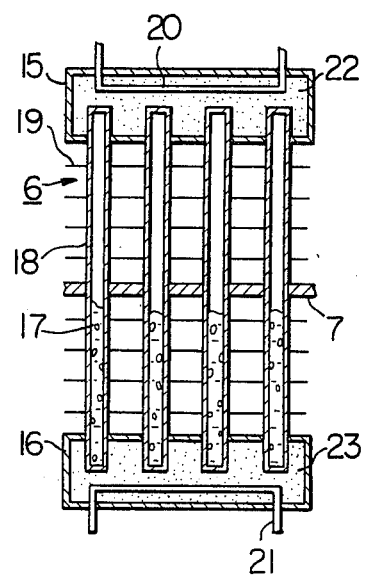
FIG. 4 is a vertical sectional view of one example of the heat exchanger of the ventilating system shown in FIGS. 1-3.

FIG. 4 shows the heat exchanger 6 in concrete constructional form including a plurality of sealed containers 18 having a vaporizable liquid 17, such as alcohol, a fluorocarbon, water, etc., sealed therein, and a multiplicity of fins 19 connected to outer wall surfaces of the containers 18. The cooler 15 is secured to the upper end of the heat exchanger 6 in such a manner that the containers 18 extend thereinto, and the heater 16 is secured to the lower end of the heat exchanger 6 in such a manner that the containers 18 extend thereinto. Cooling tubes 20 allowing a cooling medium to flow therethrough are fitted in the interior of the cooler 15, and heating tubes 21 allowing a heating medium to flow therethrough are fitted in the interior of the heater 16. The cooler 15 and heater 16 have heat transfer mediums 22 and 23 filled therein respectively to minimize thermal resistance between the sealed containers 18 on one hand and the cooling tubes 20 or heating tubes 21 on the other. The heat transfer mediums 22 and 23 may be selected from the group consisting of copper or aluminum powder, a liquid metal, such as mercury, a casting, such as aluminum, solder, etc., and a liquid, such as transformer oil, silicone oil, etc. The cooling medium flowing through the cooling tubes 20 may be selected from the group consisting of cooling water and a fluorocarbon flowing through the refrigeration cycle. The heating medium flowing through the heating tubes 21 may be selected from the group consisting of hot water obtained from a boiler, a heat accumulator, a solar heater, etc., and a fluorocarbon heated in an air conditioner.

As the cooling medium is passed through the cooling tubes 20 of the cooler 15 of the heat exchanger 6 of the aforesaid construction, the vaporizable liquid 17 in the sealed containers 18 undergoes boiling-condensation, to thereby cool the air flowing around the heat exchanger 6. As the heating medium is passed through the heating tubes 21 of the heater 16, the vaporizable liquid 17 in the sealed containers 18 undergo boiling-condensation, to thereby heat the air flowing past the heat exchanger 6. The lower and upper fans 8 and 10 located adjacent one side of the heat exchanger 6 which are through-flow blowers have their blades bent in the same direction to cooperate with the lower and upper portions of the heat exchanger 6 divided by the partition plate 7. The lower fan 8 and upper fan 10 are provided with a front guide 24a and a rear guide 25a and a front guide 24b and a rear guide 25b respectively for rotary movement around the respective fans. Each set of front and rear guides may be rotated as a unit either manually or electrically.

Figure 5:
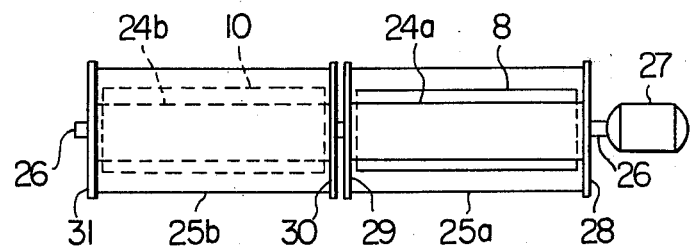
FIG. 5 is a front view of the fans, front guide and rear guide of the ventilating system shown in FIGS. 1-3.

FIG. 5 shows one example of the construction for mounting the front and rear guides for the fans 8 and 10. A rotary shaft 26 having a motor 27 connected to one end thereof extends through the central portions of the lower fan 8 and upper fan 10 and has side plates 28 and 29 for the lower fan 8 and side plates 30 and 31 for the upper fan 10 secured thereto for rotation. The side plates 28 and 29 have the front guide 24a and rear guide 25a secured thereto in juxtaposed relation, and the side plates 30 and 31 have the front guide 24b and rear guide 25b secured thereto in juxtaposed relation. Thus rotation of the side plates 28 and 29 causes the front guide 24a and rear guide 25a to rotate as a unit, and rotation of the side plates 30 and 31 causes the front guide 24b and rear guide 25b to rotate as a unit.

Referring to FIG. 1 again, sealing members 32 formed of rubber or other similar material which is intended to prevent escape of sucked or exhausted air are held in place by a support plate 34 formed with ventilating ports 33a and 33b for effecting heat recovery and a support plate 36 formed with ventilating ports 35a and 35b for effecting heat recovery. An air duct 37a between the lower fan 8 and the ventilating port 13a for effecting heat recovery and an air duct 37b between the upper fan 10 and the ventilating port 13b for effecting heat recovery are defined by the wall 5 and another wall 38 of the cabinet and the partition plate 7. The wall 38 of the cabinet is formed with ventilating ports 39a and 39b for allowing cooled air or heated air to flow therethrough in cooperation with the air ducts 37a and 37b respectively. Shutters 40a and 40b are pivotally mounted in the air ducts 37a and 37b respectively, the shutter 40a being operative to open one of the ventilating ports 13a and 39a and closing the other port and the shutter 40b being operative to open one of the ventilating ports 13b and 39b and closing the other port.

In the ventilating system of the aforesaid constructional form, when ventilation of the indoor space 1 is effected while the indoor space 1 is being cooled to reduce the temperature in the indoor space 1 below the temperature in the outdoor area 2 in the summertime the shutters 40a and 40b are moved to solid-line positions shown in FIGS. 1 and 2, to open the ventilating ports 13a and 13b and close the ventilating ports 39a and 39b. The front guide 24a and the rear guide 25a for the lower fan 8 and the front guide 24b and the rear guide 25b for the upper fan 10 are moved to the positions shown in FIG. 6A, and the ventilating ports 12a, 12b, 14a and 14b for effecting cooling by ventilation are closed while the ventilating ports 33a, 33b, 35a and 35b are opened, before the lower and upper fans 8 and 10 are actuated. In this case, the cooler 15 and heater 16 are rendered inoperative. As a result, foul air in the indoor space 1 flows through the upper portion of the heat exchanger 6 into the upper air duct 37b by virtue of the upper fan 10, to be exhausted to the outdoor area 2. Meanwhile fresh air is drawn by suction from the outdoor area 2 by the lower fan 8 into the lower air duct 37a from which the fresh air flows through the heat exchanger 6 into the indoor space 1. At this time, latent heat is recovered by the boiling-condensation action of the liquid in the sealed containers 8 of the heat exchanger 6, to thereby lessen the indoor cooling load.

Figure 6A:
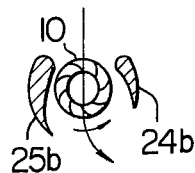
FIGS. 6A-6D are views in explanation of the positions of the front guide and rear guide of the ventilating system shown in FIGS. 1-3 in relation to the directions of flow of an air current.
Figure 6B:
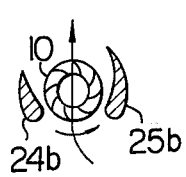
Figure 6C:
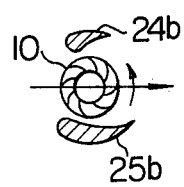
Figure 6D:
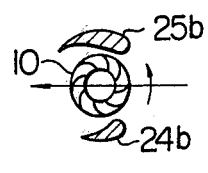

When ventilation of the indoor space 1 is effected while the indoor space 1 is being heated to raise the temperature in the indoor space 1 above the temperature in the outdoor area 2, in the wintertime, from front guide 24a and the rear guide 25a for the lower fan 8 and the front guide 24b and the rear guide 25b for the upper fan 10 are rotated through 180° from the positions shown in FIG. 6A to the positions shown in FIG. 6B while keeping the shutters 40a and 40b in the solid-line positions. This allows fresh air to the drawn by suction by the upper fan 10 from the outdoor area 2 into the upper air duct 37b from which the fresh air flows through the upper portion of the heat exchanger 6 into the indoor space 1. Meanwhile foul air is drawn by suction from the indoor space 1 through the lower portion of the heat exchanger 6 by the lower fan 8 into the lower air duct 37a from which the foul air is exhausted to the outdoor area 2. At this time, exhausted heat is recovered by the boiling-condensation action of the liquid in the sealed containers 18 of the heat exchanger 6, to thereby reduce the indoor heating load.

When the indoor space 1 is cooled in the summertime or heated in the wintertime, the shutters 40a and 40b are moved from the solid-line positions to broken line positions shown in FIGS. 1 and 2, to close the ventilating ports 13a and 13b and open the ventilating ports 39a and 39b. The front guides 24a and 24b and the rear guides 25a and 25b are switched to the positions shown in FIG. 6A and the ventilating ports 12a, 12b, 14a and 14b are closed while the ventilating ports 33a, 33b, 35a and 35b are opened. The cooler 15 at the upper end of the heat exchanger 6 is rendered operative when space cooling is effected and the heater 16 at the lower end of the heat exchanger 6 is rendered operative when space heating is effected, and at the same time the lower and upper fans 8 and 10 are actuated. This results in the air in the indoor space 1 being cooled or heated when it passes through the heat exchanger 6 and exhausted into the indoor space 1, thereby effecting space cooling or space heating. At this time, if the front guides 24a and 24b and the rear guides 25a and 25b are moved through 180° from the positions shown in FIG. 6A, then it is possible to reverse the directions of flow of air in the upper portion and the lower portion of the cabinet, while space cooling or space heating is being carried out. Also, if the front guides and the rear guides for the upper and lower fans are switched and arranged in identical positions, when it is possible to cause the air to flow in the same direction in the upper and lower portions of the cabinet.

Let us assume that cooling by ventilation is effected by drawing air by suction from the outdoor area 2 into the indoor space 1 and exhausting air from the indoor space 1 to the outdoor area 2 while rendering the air conditioner inoperative when the temperature in the outdoor area 2 drops below the temperature in the indoor space 1 at night in the summertime. The front guide 24a and the rear guide 25a for the lower fan 8 and the front guide 24b and the rear guide 25b for the upper fan 10 are moved to the positions shown in FIG. 6C, and the ventilating ports 33a, 33b, 35a and 35b are closed while the ventilating ports 12a, 12b, 14a and 14b for effecting cooling by ventilation are opened. This allows cool air to be drawn by suction from the outdoor area 2 into the indoor space 1 by the action of the lower fan 8 and foul air to be exhausted by the action of the upper fan 10 from the indoor space 1 to the outdoor area 2. If the front guides 24a and 24b and the rear guides 25a and 25b are moved to the positions shown in FIG. 6d, then it is possible to allow cool air to be drawn by suction from the outdoor area 2 by the action of the upper fan 10 into the indoor space 1 and foul air to be exhausted from the indoor space 1 to the outdoor area 2 by the action of the lower fan 8. Also, if the front guide 24a and the rear guide 25a for the lower fan 8 and the front guide 24b and the rear guide 25b for the upper fan 10 are arranged to be in the identical positions, then it is possible to effect air suction or air exhaustion by the action of the two fans 8 and 10. When cooling by ventilation is carried out as described hereinabove, it is possible to directly draw air from the outdoor area into the indoor space by suction or exhaust air from the indoor space to outdoor area by means of a fan without passing the air through the heat exchanger. Paucity of bends in the air passage contributes to minimization of pressure loss and increased volume of air flowing through the system.

Figure 7:
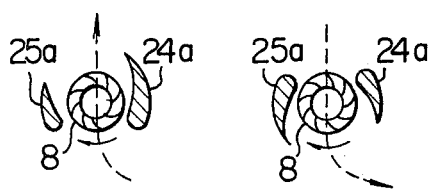
FIGS. 7 and 8 are horizontal sectional views of an upper portion and a lower portion respectively of a modification of the ventilating system shown in FIGS. 1-6D.
Figure 7:
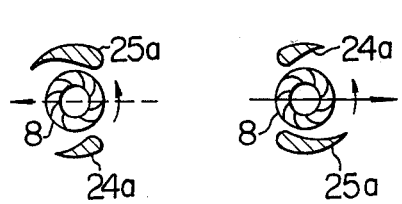
Figure 7:
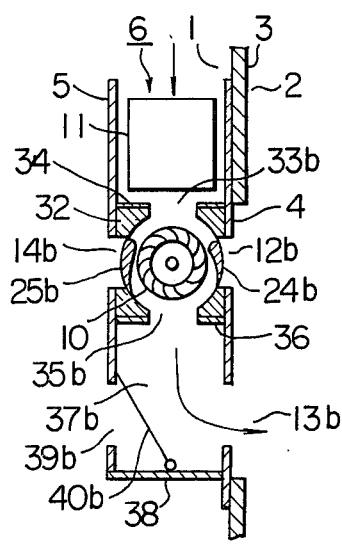
Figure 8:
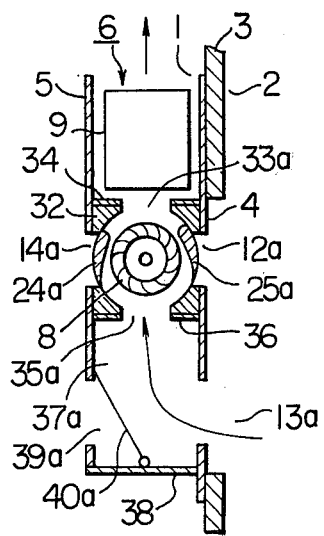
Figure 9:
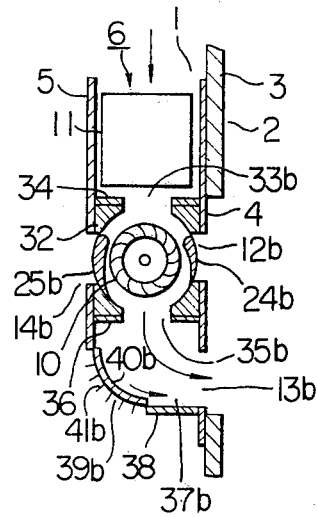
FIGS. 9 and 10 are horizontal sectional views of an upper portion and a lower portion respectively of another modification of the ventilating system shown in FIGS. 1-6D.

FIGS. 7 and 9 are horizontal sectional views of the upper portions of modifications of the ventilating system shown in FIGS. 1-6D, and FIGS. 8 and 10 are horizontal sectional views of the lower portions of modifications thereof. In the modification shown in FIGS. 7 and 8, the ventilating ports 39a and 39b for allowing cooled air or heated air to flow therethrough are not formed in the wall 38 of the cabinet but disposed in the wall 5 in positions corresponding to the ventilating ports 13a and 13b on the wall 4, and the shutters 40a and 40b each have one end thereof pivotally connected to the center of the wall 38 of the cabinet. By pivotally moving the shutters 40a and 40b, it is possible to open ventilating ports 13a and 13b and close the ventilating ports 39a and 39b or vice versa. Other parts of the modification are similar to those of the system shown in FIGS. 1-6D. The modification shown in FIGS. 9 and 10 has arcuate ventilating ports 39a and 39b interposed between the walls 5 and 38 of the cabinet which are provided with deflection plates 41a and 41b respectively for altering the directions of flow of air streams. The shutters 40a and 40b are arcuate in shape to match the ventilating ports 39a and 39b respectively. By moving the shutters 40a and 40b, it is possible to open one of the ventilating ports 39a and 39b and close the other ventilating port. Other parts are similar to those of the system shown in FIGS. 1-6D. The provision of the arcuate shutters 40a and 49b allows smooth flow of the air through the air ducts 37a and 37b. Also, it is possible to select as desired the direction of flow of the air introduced into the indoor space 1.

Figure 11:
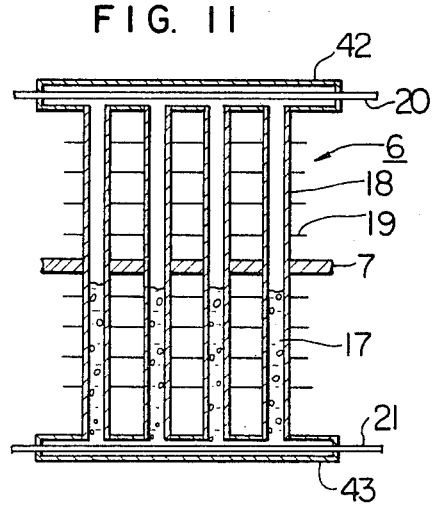
FIG. 11 is a vertical sectional view of another example of the heat exchanger of the ventilating system according to the invention.
Figure 12:
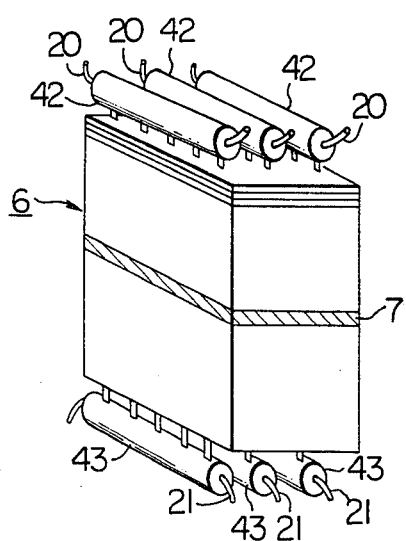
FIG. 12 is a perspective view of the heat exchanger shown in FIG. 11.

FIGS. 11 and 12 show another form of heat exchanger 6 used in the ventilating system according to the invention. As shown, the plurality of sealed containers 18 are open at their upper and lower ends, the open upper ends being maintained in communication with a plurality of manifolds 42 and the open lower ends being maintained in communication with a plurality of manifolds 43. Each manifold 42 has extending therethrough one of the cooling tubes 20 of the cooler, and each manifold 43 has extending therethrough one of the heating tubes 21 of the heater. When a cooling medium flows through the cooling tubes 20, outer surfaces of the cooling tubes 20 act as condensing surfaces; and when a heating medium flows through the heating tubes 21, outer surface of the heating tubes 21 act as boiling surfaces. In many applications, the manifolds 42 and 43 are each used in a plurality of numbers. In this case, each heating tube 21 (or cooling tube 20) has lines connected to inlet and outlet ends thereof for introducing a heating medium (or cooling medium) thereinto from outside. To this end, the inlet and outlet ends of the heating tubes 21 (or cooling tubes 20) are preferably positioned on the same side and, if possible, in the same position, to facilitate connecting of the heating tubes 21 (or cooling tubes 20) to an outside source of medium.

Figure 13A:
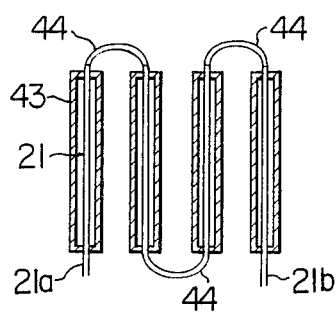
FIGS. 13A-13C are views showing the manner in which the heating tubes in the manifolds of the heat exchanger shown in FIGS. 11 and 12 are interconnected.
Figure 13B:
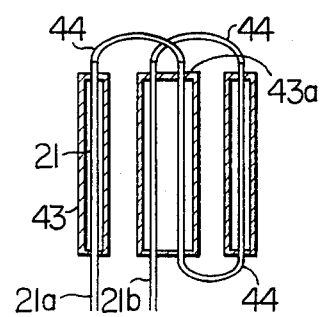
Figure 13C:
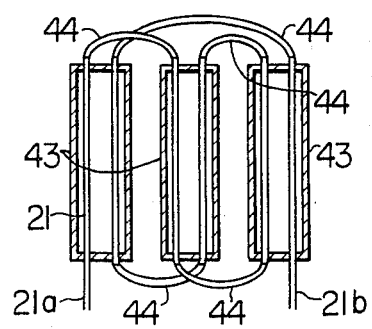

FIGS. 13A–13C show connections formed between the heating tubes 21 in the manifolds 43 of the heater to an outside source of heating medium. In FIG. 13A, there are shown even-numbered manifolds 43 and the heating tubes 21 each extending through one of the manifolds 43 are interconnected at their ends by U-bends 44 into a serpentine tube having an inlet end 21a and an outlet end 21b on the same side. FIGS. 13B and 13C show the manifolds 43 in odd number. In FIG. 13B, two heating tubes 21 extend through the center manifold 43a and the heating tube 21 extending through each of the outer manifolds 43 is connected to one of the heating tubes 21 of the center manifold 43 by a U-bend 44, leaving the inlet end 21a and the outlet end 21b on the same side. In FIG. 13C, each manifold 43 has two heating tubes 21 extending therethrough and each outer manifold 43 has one of its heating tubes 21 connected to one of the heating tubes 21 of the center manifold 43 and the other heating tube 21 connected to the other heating tube 21 of the outer manifold 43, by U-bends 44. Thus the inlet 21a end and outlet end 21b are disposed on the same side. The cooling tubes extending through the manifolds of the cooler are connected to an outside source of cooling medium in the same manner.

Figure 14:
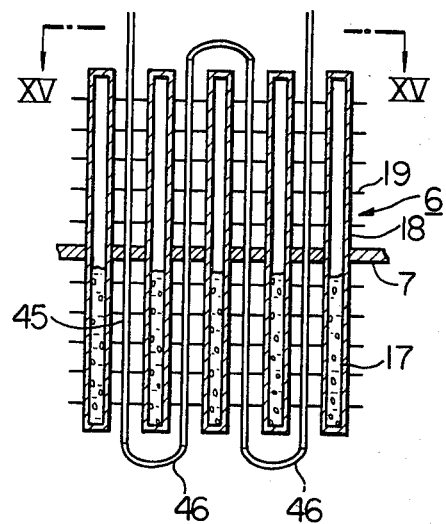
FIG. 14 is a vertical sectional view of still another example of the heat exchanger of the ventilating system according to the invention.
Figure 15:
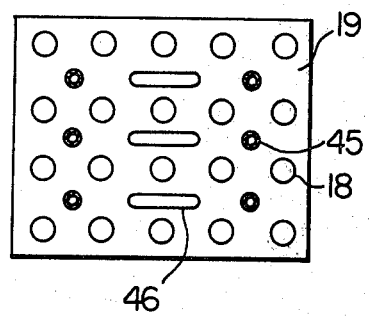
FIG. 15 is a view as seen in the direction of arrows XV—XV in FIG. 14.

FIGS. 14 and 15 show another example of the heat exchanger 6, in which tubes 45 extending through the fins 19 are disposed between the sealed containers 18 and interconnected by U-bends 46, to effect both heating and cooling. The use of the tubes 45 interconnected to form a serpentine tube eliminates the need to use the cooler and the heater disposed on the upper ends and the lower ends of the sealed containers 18, thereby simplifying the construction.

Figure 10:
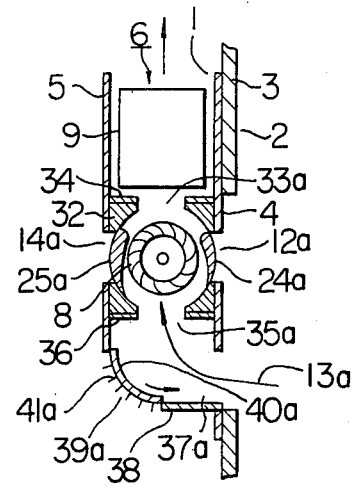
Figure 16:
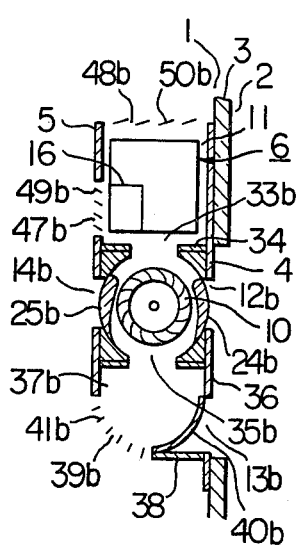
FIGS. 16 and 17 are horizontal sectional views of upper and lower portions respectively of the ventilating system comprising still another embodiment of the invention.
Figure 17:
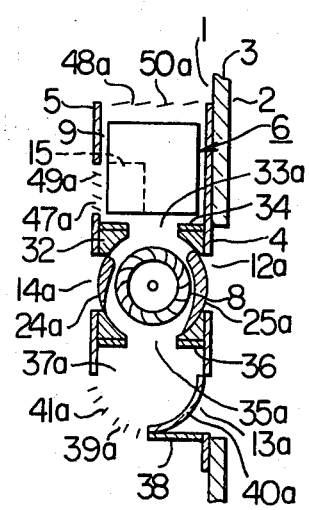
Figure 18:
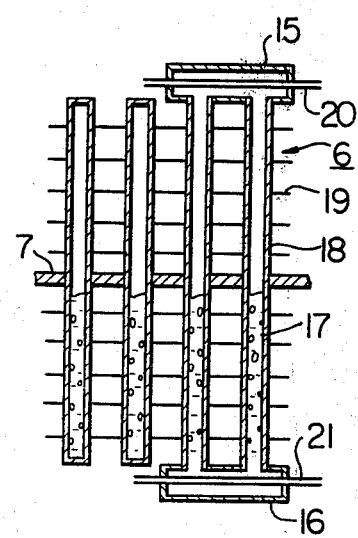
FIG. 18 is a vertical sectional view of the heat exchanger of the ventilating system shown in FIGS. 16 and 17.

FIGS. 16 and 17 are horizontal sectional views of upper and lower portions respectively of the ventilating system comprising another modification of the invention, wherein parts similar to those shown in FIGS. 9 and 10 are designated by like reference characters. In this embodiment, some of the sealed containers 18 have the cooler 15 and the heater 16 connected to their upper ends and the lower ends respectively. This arrangement is made possible when the cooling medium flowing through the cooling tubes 20 can have its temperature reduced to a very low level or the heating medium flowing through the heating tubes 21 can have its temperature raised to a very high level, because in such case the heat transfer area of the fins 19 need not be so large as to make heat recovery possible. Ventilating ports 47a and 47b for cooled air or heated air are formed in the wall 5 of the cabinet in positions corresponding to the portions of the sealed containers 18 in which the cooler 15 and heater 16 of the heat exchanger 6 are disposed. Deflecting plates 49a and 50a are mounted in the ventilating port 47a and an air passage 48a on the open side of the heat exchanger 6 respectively, and deflecting plates 49b and 50b are mounted in the ventilating port 47b and an air passage 48b on the open side of the heat exchanger 6 respectively. The deflecting plates 49a, 49b, 50a and 50b perform the functions of changing the direction of air current and completely closing the ventilating ports 47a and 47b.

In this construction, when cooled air or heated air is supplied to the indoor space 1 to effect space cooling or space heating, the deflecting plates 50a and 50b are closed, deflecting plates 49a and 49b are opened, and the shutters 40a and 40b are rotated to close the ventilating ports 13a and 13b and open the ventilating ports 39a and 39b. When heat recovery is effected, the deflecting plates 49a and 49b are closed, deflecting plates 50a and 50b are opened, and the shutters 40a and 40b are rotated to open the ventilating ports 13a and 13b and close the ventilating ports 39a and 39b. In this construction, it is possible to obtain a compact size in the cooler 15 and heater 16, to reduce the resistance offered to the flow of air current because air or heated air only flows through part of the heat exchanger when space cooling or space heating is carried out, and to allow an air current of large volume to flow through the ventilating system.

From the foregoing description, it will be appreciated that ventilating system according to the invention includes a heat exchanger for effecting heat recovery having connected thereto an auxiliary heat exchanger functioning as a cooler or a heater. By this arrangement, the ventilating system can effect space cooling or space heating in addition to exhausted heat recovery and cooling by ventilation, thereby eliminating the need to use an additional cooling or heating system or an air conditioning system. Moreover, the ventilating system is compact in overall size and best utilized as a packaged unit in which all the components are in a self-contained assembly.

What is claimed is:

1. A ventilating system comprising:

a cabinet;

a heat exchanger utilizing boiling and condensation of a fluid mounted in said casing;

a first air passage and a second air passage defined in said cabinet by a partition plate extending horizontally across said heat exchanger substantially in the center thereof; and at least one air sucking and exhausting fan mounted in one of said first air passage and said second air passage; wherein the improvement comprises:

at least one auxiliary heat exchanger functioning as a cooler when space cooling is effected by said ventilating system and a heater when space heating is effected thereby;

a ventilating port for effecting heat recovery and a ventilating port for allowing cooled air or heated air to flow therethrough formed in said cabinet to cooperate with one air duct communicationg with said first air passage;

a ventilating port for effecting heat recovery and a ventilating port for allowing cooled air or heated air to flow therethrough formed in said cabinet to cooperate with another air duct communicating with said second air passage;

a plurality of shutters, one of said shutters being mounted in said first air passage for alternately opening and closing said ventilating port for effecting heat recovery and said ventilating port for allowing cooled air or heated air to flow therethrough and the other shutter being mounted in said second air passage for alternately opening and closing said ventilating port for effecting heat recovery and said ventilating port for allowing cooled air or heated air to flow therethrough; and a plurality of ventilating ports for effecting cooling by ventilation and a plurality of ventilating ports for effecting heat recovery formed in said first air passage and a plurality of ventilating ports for effecting cooling by ventilation and a plurality of ventilating ports for effecting heat recovery formed in said second air passage;

wherein said various ventilating ports are alternately opened and closed to suit the conditions of operating the ventilating system in a heat recovery mode, a cooling by ventilation mode, and a space cooling or space heating mode.

2. A ventilating system as claimed in claim 1, wherein said auxiliary heat exchanger is plural in number, one auxiliary heat exchanger being mounted on the upper end of said heat exchanger to function as a cooler and the other auxiliary heat exchanger being mounted on the lower end of said heat exchanger to function as a heater.

3. A ventilating system as claimed in claim 1, wherein said auxiliary heat exchanger includes a plurality of heat exchangers located between sealed containers of said heat exchanger.

4. A ventilating system as claimed in claim 1, wherein said auxiliary heat exchanger functioning as a cooler when space cooling is effected by said ventilating system and as a heater when space heating is effected thereby is connected to one part of said heat exchanger, and at least one ventilating port for allowing cooled air or heated air to flow therethrough is formed in a wall of said cabinet defining a space to be cooled or heated in a position corresponding to the position of said one part of said heat exchanger connected to said auxiliary heat exchanger, so that said ventilating port for allowing cooled air or heated air to flow therethrough is opened and open ends of said passages facing the cooled or heated space are closed when space cooling or space heating is effected by said ventilating system.

5. A ventilating system as claimed in claim 4, wherein said auxiliary heat exchanger is plural in number, one auxiliary heat exchanger being mounted on the upper and of said one part of said heat exchanger and the other auxiliary heat exchanger being mounted on the lower end of said one part of said heat exchanger.

6. A ventilating system as claimed in claim 4, wherein said auxiliary heat exchanger includes a plurality of heat exchangers located between sealed containers of said one part of said heat exchanger.

* * * * *